US008429032B2

(12) United States Patent
Greenbaum et al.

(10) Patent No.: US 8,429,032 B2
(45) Date of Patent: Apr. 23, 2013

(54) METHOD AND SYSTEM FOR MANAGING INVENTORY FOR A MIGRATION USING FORECAST/INVENTORY DISPLAYS

(75) Inventors: Joseph I. Greenbaum, Ballston Lake, NY (US); Scott D. Hicks, Underhill Center, VT (US); Stephen C. Kimball, Haverhill, MA (US); James A. Martin, Jr., Endicott, NY (US); Jamie P. Rigoni, Fairfax, VT (US); David H. Sutherland, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1588 days.

(21) Appl. No.: 11/065,889

(22) Filed: Feb. 24, 2005

(65) Prior Publication Data
US 2006/0190361 A1 Aug. 24, 2006

(51) Int. Cl.
*G06Q 10/00* (2012.01)
(52) U.S. Cl.
USPC ............................................ 705/28; 705/7.11
(58) Field of Classification Search ........................ None
See application file for complete search history.

(56) References Cited

U.S. PATENT DOCUMENTS

| 5,963,919 | A | 10/1999 | Brinkley et al. |
| 6,662,357 | B1 * | 12/2003 | Bowman-Amuah .......... 717/120 |
| 6,876,895 | B2 * | 4/2005 | Seimiya et al. ............... 700/106 |
| 6,988,104 | B2 * | 1/2006 | Kootale ................................. 1/1 |
| 7,222,082 | B1 * | 5/2007 | Adhikari et al. ............. 705/7.22 |
| 7,516,084 | B1 * | 4/2009 | Sankaran et al. ............. 705/7.31 |
| 7,523,147 | B2 * | 4/2009 | Hicks et al. ...................... 705/28 |
| 7,606,699 | B2 * | 10/2009 | Sundararajan et al. .......... 703/26 |
| 2002/0002517 | A1 | 1/2002 | Fox |
| 2003/0074284 | A1 | 4/2003 | Bowden |
| 2003/0212590 | A1 | 11/2003 | Klingler |
| 2004/0146147 | A1 * | 7/2004 | Picard et al. ............... 379/88.22 |
| 2004/0267581 | A1 * | 12/2004 | Krishnamurthy et al. ........ 705/7 |
| 2006/0069693 | A1 * | 3/2006 | DelGaudio et al. ........... 707/101 |

* cited by examiner

*Primary Examiner* — Asfand Sheikh
(74) *Attorney, Agent, or Firm* — Hoffman Warnick LLC; Matthew Chung

(57) ABSTRACT

The invention provides one or more displays to assist a user in managing inventory for one or more migration components in a migration. In particular, forecast data for each migration component is generated based on migration data for one or more targets and a plurality of time frames. One or more displays are generated that include the forecast data, migration data, and/or inventory data for the migration components.

30 Claims, 8 Drawing Sheets

FIG. 3

FORECAST DISPLAY

| SITE | ITEM TYPE | MODEL NUMBER | CM-1 | CURR. MONTH | CM+1 | CM+2 | CM+3 | CM+4 | CM+5 | CM+6 | CM+7 | CM+8 | CM+9 | 3-MO. FORCST | PHYS INVNT. |
|---|---|---|---|---|---|---|---|---|---|---|---|---|---|---|---|
| | | MONTH | DEC | JAN | FEB | MAR | APR | MAY | JUN | JUL | AUG | SEP | OCT | JAN-FEB-MAR | |
| ▼LOCATION A | | | 7 | 42 | 45 | 45 | 37 | 42 | 43 | 40 | 40 | 40 | 40 | 132 | 65 |
| ▼ITEM A | | | 7 | 37 | 40 | 35 | 22 | 20 | 18 | 15 | 15 | 15 | 15 | 112 | 65 |
| ▼COMPONENT A | | | 5 | 25 | 25 | 25 | 15 | 15 | 18 | 15 | 15 | 15 | 15 | 75 | 30 |
| SCHEDULED | | | 5 | 25 | 25 | 10 | 5 | 0 | 0 | 0 | 0 | 0 | 0 | 60 | |
| PROJECTED | | | 0 | 0 | 0 | 15 | 10 | 15 | 18 | 5 | 0 | 0 | 0 | 15 | |
| ESTIMATED | | | 0 | 0 | 0 | 0 | 0 | 0 | 0 | 0 | 0 | 0 | 0 | 0 | |
| ▲COMPONENT B | | | 2 | 12 | 15 | 10 | 7 | 5 | 0 | 0 | 0 | 0 | 0 | 37 | 35 |
| ▲ITEM B | | | 0 | 5 | 5 | 10 | 15 | 22 | 25 | 25 | 25 | 25 | 25 | 20 | 0 |
| ▼LOCATION B | | | 0 | 10 | 8 | 11 | 8 | 12 | 11 | 9 | 5 | 0 | 0 | 29 | 60 |
| ▼ITEM A | | | 0 | 7 | 6 | 9 | 7 | 8 | 5 | 4 | 3 | 0 | 0 | 22 | 52 |
| ▲COMPONENT A | | | 0 | 5 | 6 | 7 | 4 | 6 | 4 | 2 | 1 | 0 | 0 | 18 | 37 |
| ▲COMPONENT B | | | 0 | 2 | 0 | 2 | 3 | 2 | 1 | 2 | 2 | 0 | 0 | 4 | 15 |

▲REFRESH FORECAST ▲REFRESH ALL ▲HELP

FIG. 4

FORECAST DISPLAY (70A)

| SITE | ITEM TYPE | MODEL NUMBER | MONTH | CM-1 | CURR. MONTH | CM+1 | CM+2 | CM+3 | CM+4 | CM+5 | CM+6 | CM+7 | CM+8 | CM+9 | 3-MO. FORCST | PHYS INVNT. |
|---|---|---|---|---|---|---|---|---|---|---|---|---|---|---|---|---|
| | | | MONTH | DEC | | | | | | | | | | OCT | JAN-FEB-MAR | |
| ▼LOCATION A | | | | 7 | | | | | | | | | | 40 | 132 | 65 |
| | ▼ITEM A | | | 7 | | | | | | | | | | 15 | 112 | 65 |
| | | ▼COMPONENT A | | 5 | | | | | | | | | | 15 | 75 | 30 |
| | | SCHEDULED | | 5 | | | | | | | | | | 0 | 60 | |
| | | PROJECTED | | 0 | | | | | | | | | | 0 | 15 | |
| | | ESTIMATED | | 2 | | | | | | | | | | 15 | 0 | 35 |
| | | ▲COMPONENT B | | 0 | | | | | | | | | | 0 | 37 | 0 |
| | ▲ITEM B | | | 0 | | | | | | | | | | 25 | 20 | 60 |
| ▼LOCATION B | | | | 0 | | | | | | | | | | 0 | 29 | 52 |
| | ▼ITEM A | | | 0 | | | | | | | | | | 0 | 22 | 37 |
| | | ▲COMPONENT A | | 0 | | | | | | | | | | 0 | 18 | 15 |
| | | ▲COMPONENT B | | | | | | | | | | | | | 0 | 4 | |

▲ REFRESH FORECAST   ▲ REFRESH ALL   ▲ HELP

UPDATE FORECAST INFORMATION *76A*

ESTIMATED FORECAST INFORMATION

SITE: LOCATION A ▶
ITEM TYPE: ITEM A ▶
MODEL NUMBER: COMPONENT A ▶

| CURRENT MONTH -1 | 0 |
| CURRENT MONTH | 0 |
| CURRENT MONTH +1 | 0 |
| CURRENT MONTH +2 | 0 |
| CURRENT MONTH +3 | 0 |
| CURRENT MONTH +4 | 0 |
| CURRENT MONTH +5 | 0 |
| CURRENT MONTH +6 | 10 |
| CURRENT MONTH +7 | 15 |
| CURRENT MONTH +8 | 15 |
| CURRENT MONTH +9 | 15 |

COMMENT: *78A*

[OK] [CANCEL] [UPDATE]

FIG. 6

| SITE | ITEM TYPE | MODEL NUMBER 84A | RCVD DISTRIB. 84B | RCVD OTHER 84C | OTHER SENT 84D | NET RCVD 84E | CMPLT DEPLOY 84F | PHYS INVNT. 84G | INVNT. ADJUST 84H | INVNT. DELTA 84I | OPEN MIGRAT. 84J | PROJCTD DEPLOY 84K | SCHED. DEPLOY 84L | AVAIL. 84M | 3-MO FORCST |
|---|---|---|---|---|---|---|---|---|---|---|---|---|---|---|---|
| ▼ LOCATION A | | | | | | | | | | | | | | | |
| | ▼ ITEM A | 126 | 10 | 0 | 136 | 64 | 65 | 5 | -2 | 65 | 63 | 121 | -56 | 112 | |
| | COMPONENT A | 69 | 10 | 0 | 79 | 42 | 30 | 5 | -2 | 65 | 63 | 70 | -40 | 75 | |
| | COMPONENT B | 57 | 0 | 0 | 57 | 22 | 35 | 0 | 0 | 0 | 0 | 51 | -16 | 37 | |
| | ▲ ITEM B | 50 | 0 | 5 | 45 | 10 | 35 | 0 | 0 | 140 | 37 | 20 | 15 | 20 | |
| ▼ LOCATION B | | | | | | | | | | | | | | | |
| | ▼ ITEM A | 76 | 0 | 10 | 66 | 14 | 52 | 0 | 0 | 7 | 20 | 22 | 0 | 22 | |
| | ▲ COMPONENT A | 58 | 0 | 10 | 48 | 11 | 37 | 0 | 0 | 3 | 14 | 18 | 0 | 18 | |
| | ▲ COMPONENT B | 18 | 0 | 0 | 18 | 3 | 15 | 0 | 0 | 4 | 6 | 4 | 0 | 4 | |
| | ▲ ITEM B | 8 | 5 | 0 | 13 | 5 | 8 | 0 | 0 | 0 | 0 | 7 | 0 | 7 | |

▲ REFRESH INVENTORY ▲ REFRESH ALL ▲ HELP

INVENTORY DISPLAY (80B)

SITE ▶ LOCATION A

ITEM TYPE ▶ ITEM A

MODEL NUMBER ▶ COMPONENT A

| | |
|---|---|
| RECEIVED FROM DISTRIBUTOR | 69 |
| RECEIVED FROM OTHER | 10 |
| SENT TO OTHER | 0 |
| NET RECEIVED | 79 |
| COMPLETED DEPLOYMENTS | 42 |
| PHYSICAL INVENTORY | 30 |
| ADJUSTMENTS | 5 |
| INVENTORY DELTA | -2 |
| OPEN MIGRATIONS | 65 |
| PROJECTED DEPLOYMENTS | 63 |
| SCHEDULED DEPLOYMENTS | 70 |
| AMOUNT AVAILABLE | -40 |
| THREE MONTH FORECAST | 75 |

[ CLOSE ]

▲ REFRESH INVENTORY   ▲ REFRESH ALL   ▲ HELP

METHOD AND SYSTEM FOR MANAGING INVENTORY FOR A MIGRATION USING FORECAST/INVENTORY DISPLAYS

BACKGROUND OF THE INVENTION

1. Technical Field

The invention relates generally to inventory management, and more particularly, to a solution for managing and forecasting the inventory of one or more components during a migration, such as an information technology migration.

2. Background Art

In information technology (IT), a "migration" is a change from one hardware and/or software technology to another. A migration may be performed for various reasons, and typically includes one or more hardware/software components being migrated (e.g., installed, removed, replaced, upgraded, patched, etc.) on one or more targets (e.g., computers, workstations, etc.). To this extent, a migration may synchronize the software/hardware for all users in a company, enable an IT infrastructure to accommodate more users, modernize the IT infrastructure, etc. For example, an entity (e.g., a company) may migrate each user's computer from one operating system (e.g., Windows® XP®) to another operating system (e.g., Linux®). In this case, the Linux® operating system is a key component of the migration, and having a sufficient number of copies of the Linux® operating system available for installation is essential in implementing the migration.

During a typical migration, a target group of users and their corresponding migration-related needs are identified. Subsequently, a timetable for performing the migration can be generated. The timetable can estimate an amount of and a time period during which a particular hardware/software component will be required to be available for installation. In general, an IT manager/department will generate and manage the timetable for the group of users and the new hardware/software component(s).

For a large entity, several IT departments may be involved in performing a migration. For example, International Business Machines of Armonk, N.Y. (IBM) has several sites, each of which has its own IT department. During an entity-wide migration (e.g., from a token ring network to an ethernet network) for a large entity such as IBM, component-related problems, e.g., a shortfall in the availability of one or more migration components, are more likely to occur. However, these problems can frequently be averted and/or resolved by cooperation between the various sites and IT departments. To facilitate this sharing, it is desirable to readily obtain inventory and forecast information for the various sites.

To date, there is no solution for effectively managing and forecasting the inventory for one or more key components of an IT migration. To this extent, a need exists for an improved solution for managing and forecasting inventory of component(s) for an entity during the migration. In particular, there exists a need for a solution that enables the inventory of one or more key components of the migration to be managed and forecast on an entity-wide basis.

SUMMARY OF THE INVENTION

The invention provides a solution for managing inventory for a migration. In particular, the invention provides a solution that generates one or more displays that enable a user to readily view and/or modify inventory data and/or forecast data for one or more migration components. The forecast data can be generated based on migration data for the migration and a plurality of time frames. For example, the migration data can include a scheduled and/or a projected migration date for one or more targets for the migration. This data can be used to generate a total amount of migrations forecast to occur during a particular time frame. The user can define additional forecast data, such as an estimated amount of migrations for one or more of the time frames. Still further, the user can view inventory data together with the forecast and/or migration data to assist in purchasing decisions, anticipate alterations to the forecast that may be required, determine a solution for responding to an inventory shortage, etc. As a result, the invention provides an improved solution for managing inventory for the migration, in which the display(s) can be used to assist user(s) in making scheduling, purchasing, or other migration-related decisions.

A first aspect of the invention provides a method of managing inventory for a migration, the method comprising: obtaining target data for a set of targets, wherein the target data for each target in the set of targets includes migration data for at least one migration component; obtaining a plurality of time frames, wherein a start time frame is automatically determined based on a current date; generating forecast data for each of the at least one migration component based on the migration data and the plurality of time frames; and generating a forecast display that includes the forecast data for each of the at least one migration component.

A second aspect of the invention provides a method of managing inventory for a migration, the method comprising: obtaining at least one migration component for the migration; obtaining target data for a set of targets, wherein the target data for each target in the set of targets includes migration data for the at least one migration component; obtaining inventory data for each of the at least one migration component; generating forecast data for each of the at least one migration component based on the migration data and a plurality of time frames; and generating an inventory display that includes the inventory data and the forecast data for each of the at least one migration component.

A third aspect of the invention provides a system for managing inventory for a migration, the system comprising: a system for obtaining target data for a set of targets, wherein the target data for each target in the set of targets includes migration data for at least one migration component; a system for obtaining inventory data for each of the at least one migration component; a system for generating forecast data for each of the at least one migration component based on the migration data and a plurality of time frames; a system for generating a forecast display that includes the forecast data for each of the at least one migration component; and a system for generating an inventory display that includes the inventory data and the forecast data for each of the at least one migration component.

A fourth aspect of the invention provides a program product stored on a computer-readable medium, which when executed, manages inventory for a migration, the program product comprising: program code for obtaining target data for a set of targets, wherein the target data for each target in the set of targets includes migration data for at least one migration component; program code for obtaining inventory data for each of the at least one migration component; program code for generating forecast data for each of the at least one migration component based on the migration data and a plurality of time frames; program code for generating a forecast display that includes the forecast data for each of the at least one migration component; and program code for generating an inventory display that includes the inventory data and the forecast data for each of the at least one migration component.

A fifth aspect of the invention provides a method of deploying an application for managing inventory for a migration, the method comprising: providing a computer infrastructure being operable to: obtain target data for a set of targets, wherein the target data for each target in the set of targets includes migration data for at least one migration component; obtain a plurality of time frames, wherein a start time frame is automatically determined based on a current date; generate forecast data for each of the at least one migration component based on the migration data and the plurality of time frames; and generate a forecast display that includes the forecast data for each of the at least one migration component.

A sixth aspect of the invention provides computer software embodied in a propagated signal for managing inventory for a migration, the computer software comprising instructions to cause a computer system to perform the following functions: obtain target data for a set of targets, wherein the target data for each target in the set of targets includes migration data for at least one migration component; obtain a plurality of time frames, wherein a start time frame is automatically determined based on a current date; generate forecast data for each of the at least one migration component based on the migration data and the plurality of time frames; and generate a forecast display that includes the forecast data for each of the at least one migration component.

A seventh aspect of the invention provides a computer-readable medium that includes computer program code to enable a computer infrastructure to manage inventory for a migration.

An eighth aspect of the invention provides a business method for managing inventory for a migration.

A ninth aspect of the invention provides a method of generating a system for managing inventory for a migration.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 shows an illustrative forecast display;

FIG. 4 shows an illustrative forecast update display;

FIG. 6 shows an illustrative inventory display;

FIG. 8 shows an alternative inventory display for displaying inventory data for a single migration component.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing inventory for a migration. In particular, the invention provides a solution that generates one or more displays that enable a user to readily view and/or modify inventory data and/or forecast data for one or more migration components. The forecast data can be generated based on migration data for the migration and a plurality of time frames. For example, the migration data can include a scheduled and/or a projected migration date for one or more targets for the migration. This data can be used to generate a total amount of migrations forecast to occur during a particular time frame. The user can define additional forecast data, such as an estimated amount of migrations for one or more of the time frames. Still further, the user can view inventory data together with the forecast and/or migration data to assist in purchasing decisions, anticipate alterations to the forecast that may be required, determine a solution for responding to an inventory shortage, etc. As a result, the invention provides an improved solution for managing inventory for the migration, in which the display(s) can be used to assist user(s) in making scheduling, purchasing, or other migration-related decisions.

Figure 1:
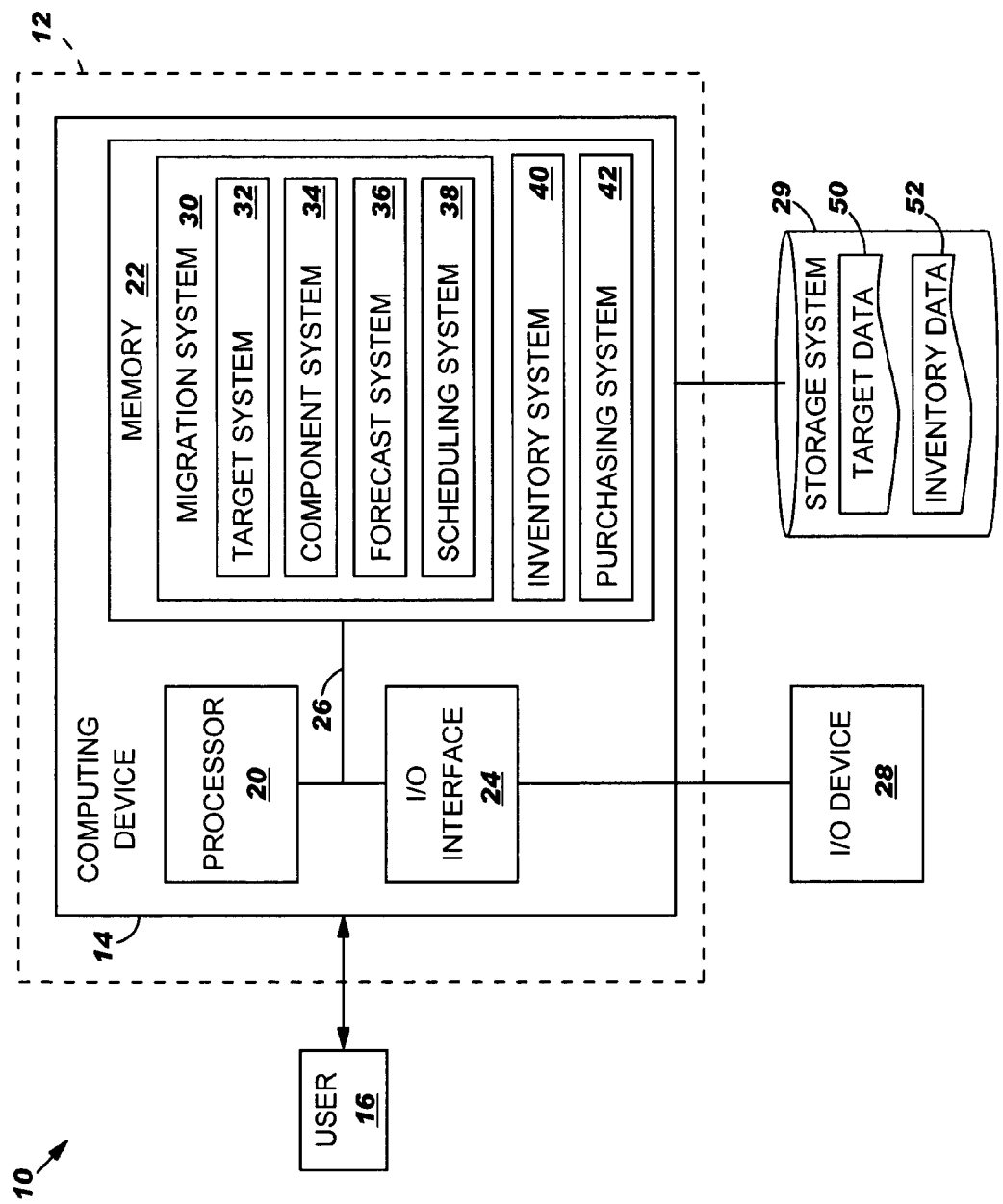
FIG. 1 shows an illustrative system for managing inventory for a migration.

Turning to the drawings, FIG. 1 shows an illustrative system 10 for managing inventory for a migration. To this extent, system 10 includes a computer infrastructure 12, which comprises a computing device 14 that can perform the various process steps described herein for managing inventory for a migration. Computing device 14 is shown including a processor 20, a memory 22, an input/output (I/O) interface 24, and a bus 26. Further, computing device 14 is shown in communication with an external I/O device/resource 28 and a storage system 29. In general, processor 20 executes computer program code, such as migration system 30, that is stored in memory 22 and/or storage system 29. While executing computer program code, processor 20 can read and/or write data, such as target data 50, to/from memory 22, storage system 29, and/or I/O interface 24. Bus 26 provides a communication link between each of the components in computing device 14. I/O device 28 can comprise any device that enables user 16 to interact with computing device 14 (e.g., keyboard, pointing device, display, etc.) or any device that enables computing device 14 to communicate with one or more other computing devices (e.g., network card, modem, wireless communications device, etc.).

Computing device 14 can comprise any general purpose computing article of manufacture capable of executing computer program code installed by a user 16 (e.g., a personal computer, server, handheld device, etc.). However, it is understood that computing device 14 and migration system 30 are only representative of various possible computing devices that may perform the various process steps of the invention. To this extent, computing device 14 can comprise any specific purpose computing article of manufacture comprising hardware and/or computer program code for performing specific functions (e.g., a modem), any computing article of manufacture that comprises a combination of specific purpose and general purpose hardware/software (e.g., a mobile phone), or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. In this case, the network can comprise one or more types of networks (e.g., the Internet, a wide area network, a local area network, a virtual private network, etc.), and communications between the computing devices may utilize various types of communications links and/or transmission techniques (e.g., wired, wireless, etc.).

As discussed further below, migration system 30 manages inventory for a migration. To this extent, migration system 30 is shown including a target system 32 for managing target data 50 for a set of targets for the migration, a component system 34 for obtaining inventory data 52 for one or more migration components, a forecast system 36 for generating forecast data for the one or more migration components, and a scheduling system 38 for obtaining migration data for each of the set of targets. Additionally, computing device 14 is shown including an inventory system 40 for managing inventory data 52 for an entity (e.g., shipping and receiving) and a purchasing system 42 for ordering components that are desired by the entity. Each of these systems can send and/or receive data to/from migration system 30 as described further below. Operation of each of these systems is discussed further below. However, it is understood that some of the various systems shown in FIG. 1 can be implemented independently, combined, and/or stored in memory for one or more separate computing devices 14 that communicate over a network. Further, it is understood that some of the systems and/or functionality may not be implemented, or additional systems and/or functionality may be included as part of system 10.

Figure 2:
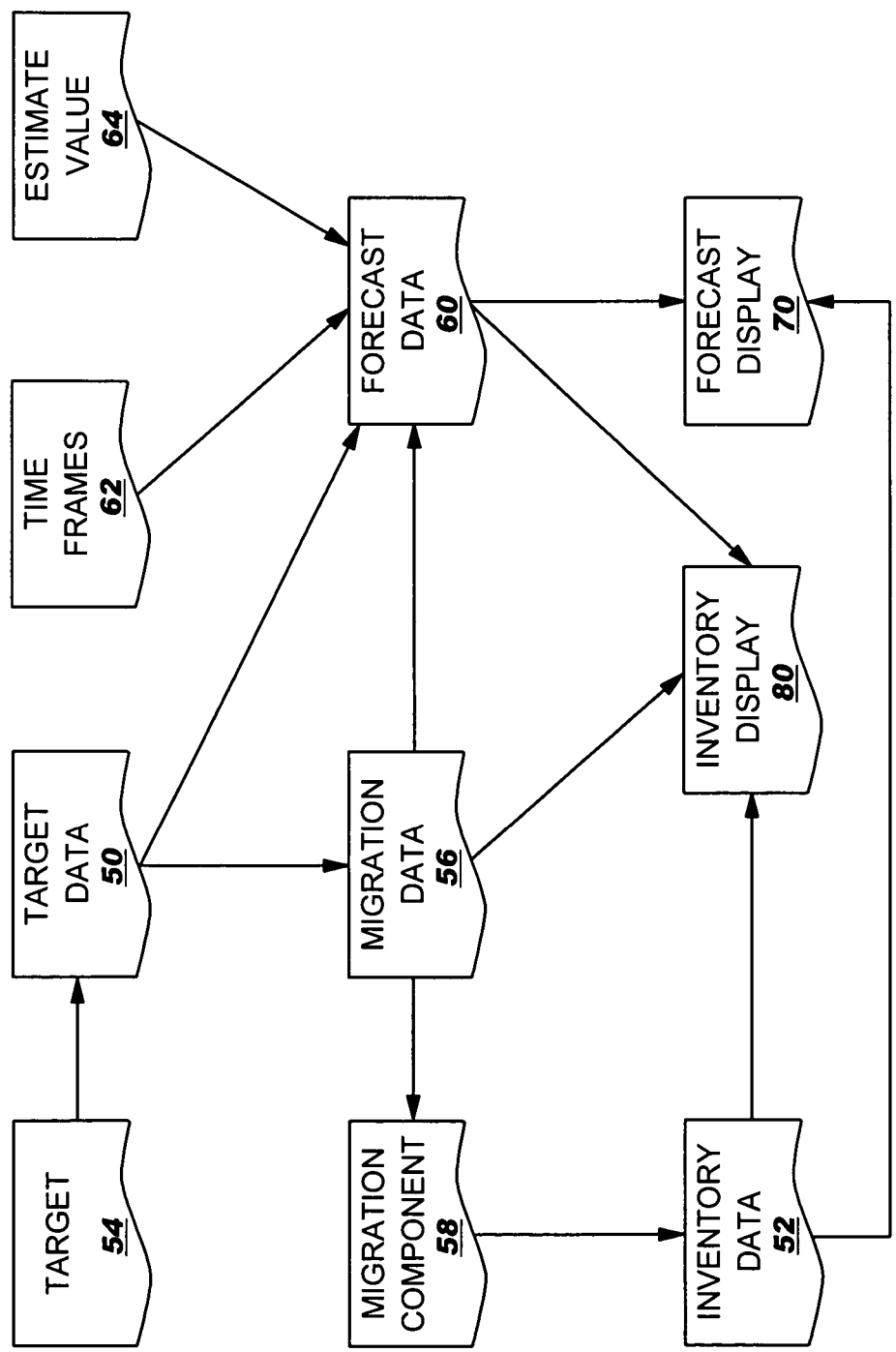
FIG. 2 shows an illustrative data flow that can be implemented by the various systems of FIG. 1.

Various aspects of the invention are now discussed with reference to FIGS. 1 and 2, in which FIG. 2 shows an illustrative data flow that can be implemented by the various systems of FIG. 1 according to one embodiment of the invention. Initially, target system 32 can determine a set (one or more) of targets 54. Each target 54 can comprise a computing device, user, etc., that is designated to be impacted by the migration. To this extent, target 54 can comprise an individual designated to receive a new telephone, a computing device designated to receive new software, a new operating system, and/or one or more new hardware components, etc. Each target 54 can be selected by user 16 or another system and provided to target system 32. Alternatively, target system 32 can automatically determine the set of targets 54 based on a set of criteria provided by user 16 (e.g., all computing devices will receive an ethernet card).

In either case, target system 32 can obtain target data 50 for each target 54. Target data 50 can include various information about the corresponding target 54. To this extent, target data 50 can identify one of a plurality of sites in which target 54 is located. For example, an entity may have several buildings, and target data 50 can identify the particular building in which target 54 is located. Additionally, target data 50 can comprise information regarding a configuration of the corresponding target 54. For example, for a personal computer, the information could include information about the monitor, motherboard, hard drive, software, operating system, etc.

As part of the migration, scheduling system 38 can obtain migration data 56 and store it as target data 50 for the corresponding target 54. For example, scheduling system 38 can present various displays to user 16 that enable user 16 to provide and/or define migration data 56. Based on this information and/or other target data 50, scheduling system 38 can generate and store migration data 56. In any event, migration data 56 can comprise one or more migration components 58 that are designated for migration (e.g., installation, upgrade, etc.) on the corresponding target 54. Additionally, for each migration component 58, migration data 56 can include a migration date and one of a plurality of migration statuses. The meaning of the migration date can depend on the corresponding migration status. For example, a migration component 58 for a particular target 54 can have a migration status of "open," meaning target 54 has been identified to be migrated with the migration component 58 but no migration date has been set. In this case, the migration date can comprise an invalid date, a date corresponding to the projected last date for the migration, or the like. Various other migration statuses are also possible. For example, the migration status could comprise "projected," meaning a rough migration date has been set for the migration (e.g., week of . . . ), "scheduled," meaning the migration date has been firmly set, or "deployed," meaning migration component 58 has been deployed to the corresponding target 54. In an alternative embodiment, migration data 56 can comprise a single migration date/migration status pair for each target 54, which may comprise a plurality of migration components 58 for the migration (e.g., all migration components are migrated at the same time).

Component system 34 obtains a set of (one or more) migration components 58 for the migration. In one embodiment, component system 34 automatically determines the migration component(s) 58 based on target data 50. In particular, component system 34 can obtain migration data 56 from target data 50 and generate the set of migration components 58 included in migration data 56. Alternatively, component system 34 can receive the set of migration components 58 from user 16 and/or another system, as is known in the art.

Component system 34 can obtain inventory data 52 for each migration component 58. In one embodiment, component system 34 requests inventory data 52 from an inventory system 40, which manages inventory data 52 for the entity. In response, inventory system 40 can provide component system 34 with inventory data 52. Inventory data 52 can comprise various information about the inventory of the corresponding migration component 58. For example, inventory data 52 can comprise a current inventory, e.g., an amount of migration component 58 that the entity possesses but has not yet deployed.

In one embodiment, component system 34 can generate additional inventory data 52 based on inventory data 52 received from inventory system 40 and/or migration data 56. For example, for a particular combination of migration component 58 and site, component system 34 can obtain from inventory system 40 an amount received and an amount sent. Further, component system 34 can determine from migration data 56 an amount of the migration component 58 that have been deployed. Based on these amounts, component system 34 can calculate a net received for the migration component 58, which could be used as the current inventory. Alternatively, the net received for the migration component 58 can be compared to a current inventory and/or one or more adjustment amounts provided by user 16. User 16 can provide an adjustment amount to account for inventory existing before the migration was started or the like. In any event, based on these values, an inventory delta (e.g., the amount that the actual inventory differs from a calculated inventory) can be determined.

In any event, forecast system 36 can obtain the set of migration components 58 from component system 34 and generate forecast data 60 for each migration component 58 and/or target 54. To this extent, forecast system 36 can obtain a plurality of time frames 62 for forecast data 60. In one embodiment, the plurality of time frames 62 is provided to forecast system 36 by user 16 and/or another system as is known in the art. Alternatively, forecast system 36 can automatically generate the plurality of time frames 62. In the latter case, a length of each time frame 62 (e.g., one month, one week, etc.) and/or a number of time frames 62 can be preset and/or specified by user 16. Based on the length of each time frame and a current date, forecast system 36 can automatically determine the plurality of time frames 62. For example, when the length of each time frame is specified as one month and the current date is in February, the plurality of time frames 62 can be generated having a start time frame of February and an ending time frame the specified number of months later.

Regardless, forecast system 36 can base forecast data 60 for migration component 58 on migration data 56 and the plurality of time frames 62. In particular, for each combination of migration component 58 and time frame 62 (e.g., forecast combination), forecast data 60 can include an amount of migration component 58 having a migration date within time frame 62. For example, for a time frame 62 comprising the month of February 2005, forecast system 36 can determine the amount of the particular migration component 58 having a migration date between Feb. 1, 2005 and Feb. 28, 2005. Further, when migration data 56 includes a plurality of migration statuses, the forecast data 60 can include an amount that corresponds to each particular migration status. In this case, forecast system 36 can determine, for each forecast combination, an amount of migration components 58 comprising a "scheduled" migration status, a "projected" migration status, etc.

In addition to migration data 56 and time frames 62, forecast system 36 can generate forecast data 60 based on additional data. In one embodiment, forecast data 60 is further based on one or more additional attributes of target 54 that are included in target data 50. For example, when target data 50 includes an identification of one of a plurality of sites, as discussed above, each forecast combination can be further defined by the identified site. To this extent, forecast system 36 can generate forecast data 60 that includes an amount for each combination of site, migration component 58, and time frame. In another embodiment, forecast data 60 is further based on estimate values 64 for each forecast combination. In particular, forecast system 36 can receive an estimate value 64 entered by user 16 and/or previously stored for each forecast combination. Subsequently, the estimate value 64 for each forecast combination can be added to the amount of migration components 58 calculated above to determine the total migrations forecast for the forecast combination.

The invention provides various displays that enable user 16 to view and/or modify the data described above. For example, once forecast data 60 has been generated, forecast system 36 can generate a forecast display 70 that includes forecast data 60 for one or more migration components 58. Further, forecast system 36 can display (e.g., render) forecast display 70 to user 16 and/or provide forecast display 70 to another system that displays forecast display 70 to user 16. In any event, FIG. 3 shows an illustrative forecast display 70A. Referring to FIGS. 1-3 collectively, forecast display 70A is shown including forecast data 60 for a plurality of sites (e.g., LOCATION A and LOCATION B) and a plurality of item types (e.g., ITEM A and ITEM B). Additionally, two models (versions) for ITEM A are required. In this case, each model (e.g., COMPONENT A and COMPONENT B) corresponds to a unique migration component 58.

As shown in FIG. 3, forecast display 70A can display forecast data 60 using a hierarchical structure. In particular, the various migration components 58 are first sorted by site and then by item type. To this extent, the hierarchical structure can be constructed based on the forecast combinations. For example, the migration may comprise the installation of an ethernet card for all computers (targets 54) of an entity. Based on the configuration of a particular target 54, a different model of an ethernet card may be required. In this case, each ethernet card model would comprise a unique migration component 58. In any event, it is understood that the hierarchical structure is only illustrative. To this extent, each migration component 58 could be listed without the hierarchy and/or more or fewer levels could be included.

Forecast display 70A includes a plurality of columns that each correspond to one of the plurality of time frames 62. To this extent, each column includes forecast data 60 for the corresponding forecast combinations for the time frame 62. In particular, forecast display 70A is shown including forecast data 60 for forecast combinations for a current month (CURR. MONTH), a previous month (CM−1) and the next nine months (CM+1 . . . CM+9). As discussed previously, forecast system 36 can automatically determine a start month based on the current date. In this case, since the time period corresponding to a particular column will periodically change, forecast display 70A is shown including a first row 72A that displays a readily recognizable abbreviation of the actual period (e.g., month) that corresponds to each time period 62. In particular, forecast display 70A could be generated when the current date is in January (JAN), and the selected start month is the previous month, i.e., December (DEC).

For each forecast combination, forecast display 70A includes forecast data 60 determined from migration data 56 as discussed above. In particular, rows 72B, 72C are shown including an amount of migration components 54 having a corresponding migration status of "scheduled" and "projected," respectively, in their migration data 56 for each of the corresponding time frames 62. Additionally, forecast display 70A includes row 72D that comprises an estimate value 64 for each of the corresponding forecast combinations.

Further, forecast display 70A includes forecast data 60 that is calculated based on other forecast data 60. To this extent, adjacent to each migration component 54, forecast display 70A includes migration component forecast values that are calculated by adding the scheduled, projected, and estimated forecast data 60 for the migration component 54. Similarly, forecast display 70A includes item forecast values adjacent to each item that are calculated by adding the corresponding migration component forecast values and site forecast values adjacent to each site that are calculated by adding the corresponding item forecast values.

Forecast display 70A can also include additional data to assist user 16 in evaluating the migration. For example, it may be desirable that the entity have sufficient migration components 58 in inventory to complete the migrations for a lead time frame that is a multiple of the defined time frames 62. As a result, forecast system 36 can generate forecast data 60 for the lead time frame by combining (e.g., adding) forecast data 60 for the corresponding plurality of time frames 62, and the forecast system 36 can include this data in forecast display 70A. To this extent, forecast display 70A is shown including a column 74A that comprises forecast data 60 for a lead time frame of three months. In particular, column 74A is calculated by adding forecast data 60 for the current month and the next two months.

Forecast display 70A can also include inventory data 52 and/or migration data 56. In particular, forecast system 36 can obtain inventory data 52 from component system 34 that corresponds to each migration component 58 and/or site, and include this data in forecast display 70A. For example, forecast display 70A is shown including a column 74B that comprises the current inventory for each migration component 58 and site combination. In this case, by examining columns 74A, 74B together, user 16 can anticipate inventory problems in that may arise during the migration. To this extent, based on forecast display 70A, user 16 can determine that LOCATION A has a current inventory of thirty for COMPONENT A, but a three-month forecast of seventy-five. As a result, LOCATION A may have an inventory shortfall in performing the migration. In response, user 16 can generate a purchase order using purchasing system 42. Further, user 16 can determine that LOCATION B has an excess inventory for COMPONENT A of nineteen for the same three-month period. Consequently, user 16 could use inventory system 40 to request that some/all of the excess inventory be shipped from LOCATION B to LOCATION A.

Forecast system 36 can enable user 16 to modify one or more values in forecast data 60. In one embodiment, user 16 can modify one or more values using forecast display 70A. Alternatively, user 16 can select to open a new display that enables user 16 to modify values. For example, FIG. 4 shows an illustrative forecast update display 76A in which user 16 can change one or more estimated values 64 for a corresponding forecast combination. In particular, user 16 can enter a new value for one or more of the displayed time frames 62 and select "update" to immediately change the value and/or "ok" to change the value and close forecast update display 76A. In either case, forecast system 36 can receive the new estimated value(s) 64 and store the forecast data 60 for future reference.

Additionally, forecast system 36 can generate and store a record of the modification as forecast data 60. In particular, the record can comprise the previous and new estimated value(s) 64, an identification of user 16 that performed the modification, a timestamp for the modification, and the like. Further, forecast update display 76A is shown including a comment text box 78A, in which user 16 can enter explanatory text for the modification(s). When user 16 inserts text into comment text box 78A, the text can be stored as part of the record for the modification. The record can be later reviewed by user 16 as discussed in a co-pending U.S. Patent Application 11/065,911 entitled "Method and System for Managing Inventory for a Migration Using History Data," which is hereby incorporated herein by reference.

Figure 5:
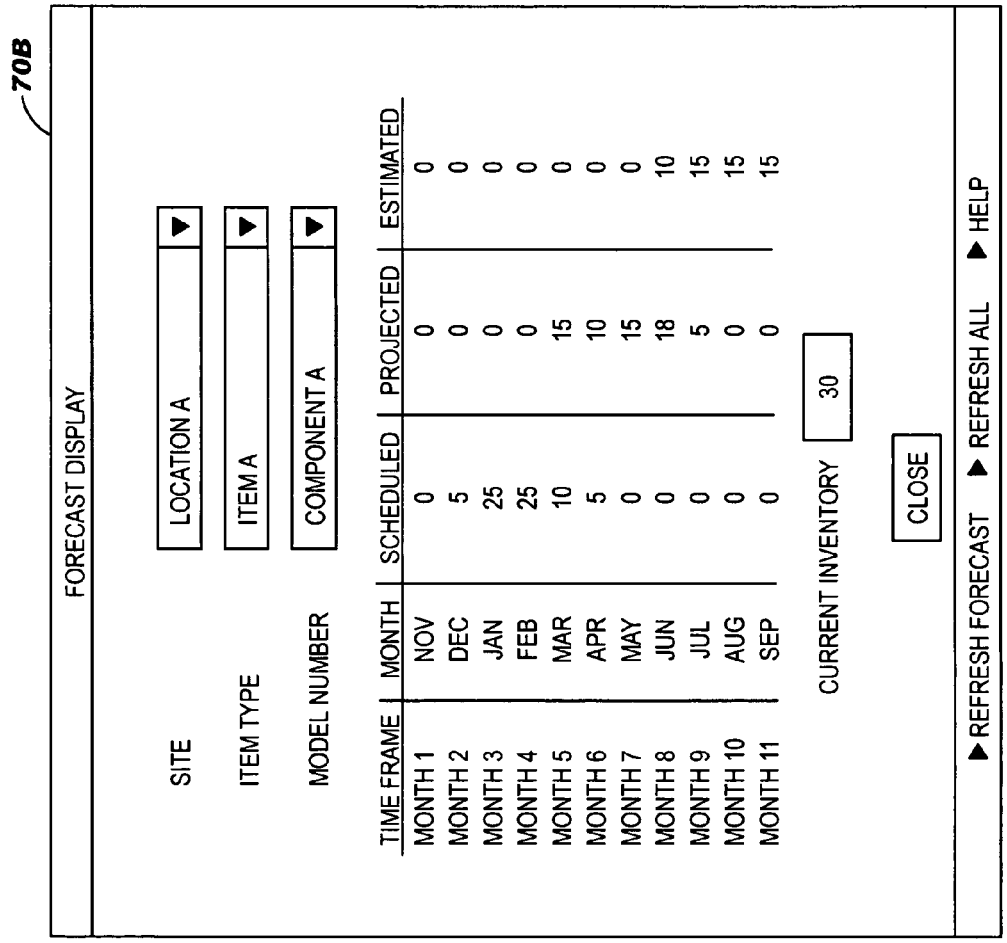
FIG. 5 shows an alternative forecast display for displaying forecast data for a single migration component.

Forecast display 70A is only illustrative of various possible display formats that can be implemented by forecast system 36. For example, FIG. 5 shows an alternative forecast display 70B for displaying forecast data 60 for a single forecast combination. In this case, user 16 can select the desired forecast combination by designating a site, item type, and migration component 58 (e.g., model number). In response, forecast system 36 can populate forecast display 70B with the forecast data 60 (e.g., scheduled, projected, and estimated forecast values) corresponding to the selected forecast combination. Numerous alternatives are possible. For example, forecast data 60 for a single migration status could be displayed in forecast display 70B, and user 16 could further select one of the migration statuses for display. Additionally, in one embodiment, the time frames 62 used for forecast display 70A and/or 70B can comprise the time frames 62 corresponding to the entire migration. For example, the migration may be expected to last eleven months, and the forecast for the entire eleven months can be displayed in forecast display 70B.

The invention also provides for the generation of other types of displays that emphasize other migration component 58 related data. To this extent, component system 34 can generate an inventory display 80 that includes inventory data 52 for one or more migration components 58. Additionally, component system 34 can display inventory display 80 and/or can provide the inventory display 80 to another system for displaying (e.g., rendering) to user 16. In any event, FIG. 6 shows an illustrative inventory display 80A according to one embodiment of the invention. Similar to forecast display 70A (FIG. 3), inventory display 80A includes inventory data 52 for a plurality of site and migration component 58 combinations. In particular, inventory display 80A includes columns 84A, 84B that display an amount of the migration component 58 that has been received from a distributor and another location (e.g., another site), respectively. Further, inventory display 80A includes a column 84C that displays an amount of the migration component 58 that has been sent to another location (e.g., another site). Based on the inventory data 52 corresponding to these columns 84A-C, column 84D can be calculated as the net amount received for the migration component 58.

Component system 34 can further include migration data 56 for migration component(s) 58 in inventory display 80A. To this extent, column 84E is shown including an amount of the corresponding migration component 58 that have been deployed. Component system 34 can receive the values for column 84E from scheduling system 38. In particular, scheduling system 38 can determine the values based on a migration status (e.g., complete) for targets 54 that have received the migration component 58 as part of the migration.

As noted above, a current inventory and/or one or more adjustments can be provided by user 16. To this extent, inventory display 80A is shown including a column 84F for displaying the current inventory (e.g., physical inventory), and a column 84G for displaying an adjustment amount that has been provided for the current inventory. Further, column 84H includes an inventory delta that is calculated based on the data in columns 84D-G. In particular, the amount of migration components 58 that have been deployed (column 84E), that are in inventory (column 84F), and the adjustment amount (column 84G) can be subtracted from the net received (column 84D) to obtain the inventory delta (column 84H). In general, this should result in a calculation of zero. However, if the data fails to accurately account for migration components 58, then the value for the inventory delta will be non-zero.

Additionally, inventory display 80A can comprise forecast data 60 for the migration component(s) 58 and/or site(s). To this extent, component system 34 can obtain forecast data 60 from forecast system 36, and display the forecast data 60 in inventory display 80A. For example, inventory display 80A is shown including columns 84I, 84J, 84K for displaying an amount of open migrations, projected deployments, and scheduled deployments for a particular migration component 58 and site combination. Further, inventory display 80A is shown including a column 84M for displaying a forecast for a lead time frame (e.g., three months), which forecast system 36 can generate as discussed above.

Further, component system 34 can calculate one or more values based on inventory data 52 and forecast data 60, and include this data in inventory display 80A. For example, inventory display 80A includes a column 84L for displaying an amount available for each corresponding migration component 58. In one embodiment, component system 34 calculates the amount available by subtracting the scheduled deployments (e.g., an amount of migration components 58 that have been committed) from the current inventory. However, it is understood that this is only illustrative, and the amount available can be calculated using any desired formula.

Figure 7:
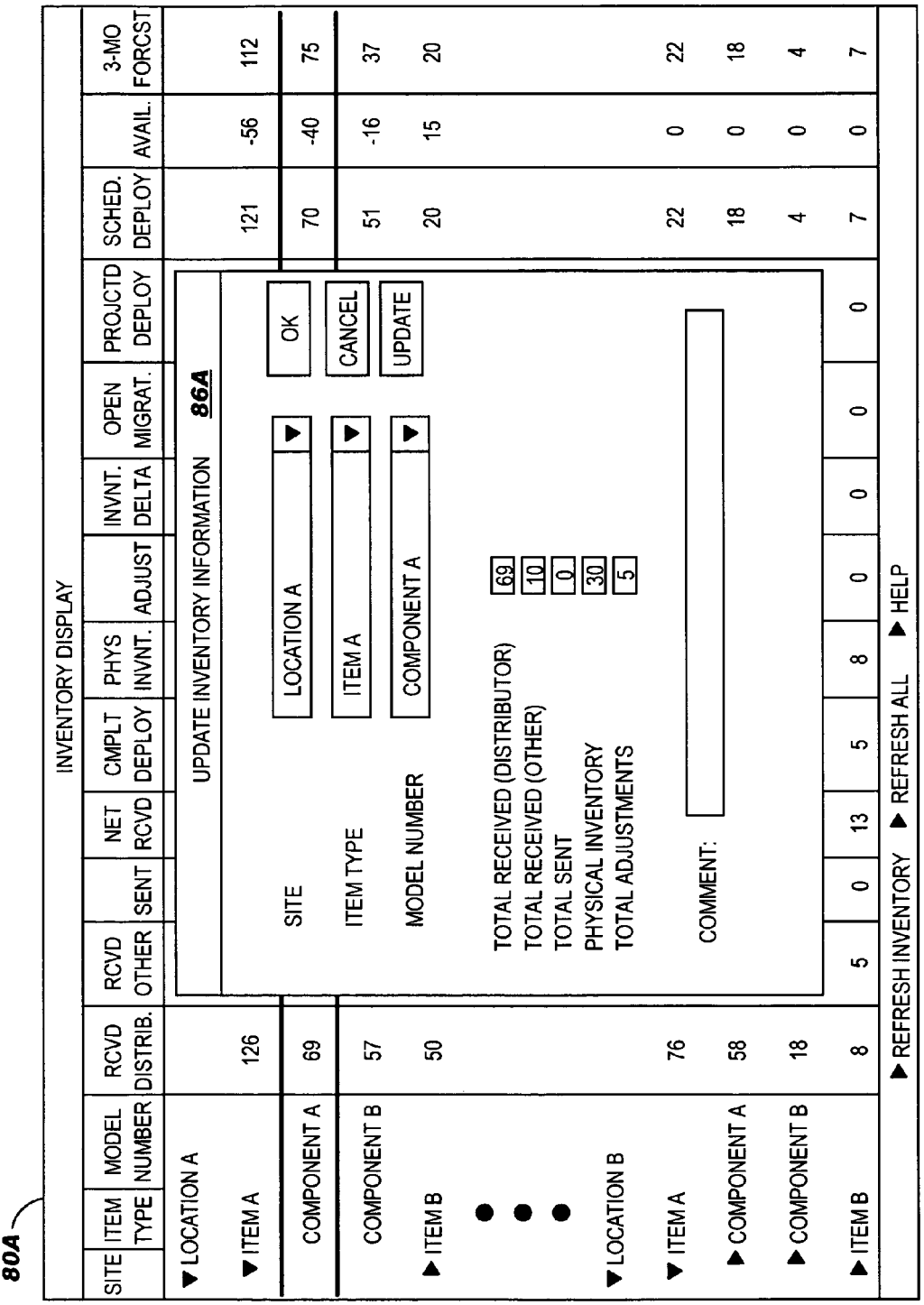
FIG. 7 shows an illustrative inventory update display.

Component system 34 can enable user 16 to modify one or more values in inventory data 52. In one embodiment, user 16 can modify one or more values using inventory display 80A. Alternatively, user 16 can select to open a new display that enables user 16 to modify values. For example, FIG. 7 shows an illustrative inventory update display 86A, in which user 16 can change one or more values for inventory data 52 for a corresponding migration component 58 and site combination. Once the new values have been specified, component system 34 can store the new values as inventory data 52 and/or provide the new values to inventory system 40 for storage.

Additionally, component system 34 can generate and store a record of the modification as inventory data 52. In particular, the record can comprise the previous and new value(s), an identification of user 16 that performed the modification, a timestamp for the modification, and the like. Further, inventory update display 86A is shown including a comment text box 88A, in which user 16 can enter explanatory text for the modification(s). When user 16 inserts text into comment text box 88A, the text can be stored as part of the record for the modification. The record can be later reviewed by user 16 as discussed in a co-pending U.S. Patent Application 11/065,911 entitled "Method and System for Managing Inventory for a Migration Using History Data," which has previously been incorporated herein by reference.

Inventory display 80A is only illustrative of various possible display formats that can be implemented by component system 34. For example, FIG. 8 shows an alternative inventory display 80B for displaying inventory data 52 for a single migration component 58 and site combination. In this case, user 16 can select the desired inventory data 52 by designating a site, an item type, and migration component 58 (e.g., model number). In response, component system 34 can populate inventory display 80B with the inventory data 52 corresponding to the selected combination.

During the migration, several users 16 may be viewing and/or editing inventory data 52, migration data 56, and/or forecast data 60. For example, an individual may complete the migration for a particular target 54, and update the migration status for target 54. Similarly, an individual in shipping may receive additional migration components 58, and modify inventory data 52 to reflect the current inventory. Various other modifications may be made as will be recognized by one in the art.

In any event, since the data on which the various displays are based may change, the corresponding system can periodically refresh the displayed data by obtaining the current data from target data 50, inventory data 52, forecast data 60, etc. In one embodiment, the various data is periodically automatically refreshed. For example, the various systems can refresh their data every night. Further, as shown in forecast displays 70A-B and inventory displays 80A-B, user 16 can select to refresh some/all of the data immediately. In this case, the various data is re-read from storage, calculated data is re-generated, and the corresponding display is re-generated. Still further, the data can be updated in real time. For example, when data is changed, a message or the like can be generated and sent to the various systems indicating that a change has occurred and/or identifying the change. Subsequently, each system having a display that is impacted, can update the display based on the change.

While shown and described herein as a method and system for managing inventory for a migration, it is understood that the invention further provides various alternative embodiments. For example, in one embodiment, the invention provides a computer-readable medium that includes computer program code to enable a computer infrastructure to manage inventory for a migration. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 29 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage inventory for a migration as described above. In this case, the service provider can create, maintain, support, etc., a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method of generating a system for managing inventory for a migration. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computerized method of managing inventory for a migration, the method comprising:
    obtaining target data for a set of targets on at least one computing device,
    wherein the target data for each target in the set of targets includes migration data for at least one migration component corresponding to the target and at least one of: a location of the target or a configuration of the target, wherein the at least one migration component comprises at least one of a hardware or software information technology component to be updated or changed as part of the migration, wherein the migration data for the at least one migration component includes one of a plurality of migration statuses and a migration date, a meaning of the migration date being based on the one of the plurality of migration statuses;

obtaining a plurality of time frames on the at least one computing device, wherein a start time frame is automatically determined based on a current date;

generating forecast data automatically for each of the at least one migration component based on the target data and the plurality of time frames using the at least one computing device;

generating a forecast display that includes the forecast data for each of the at least one migration component using the at least one computing device, wherein the forecast display displays the forecast data using a hierarchical structure that includes at least two of: a site, an item type, and the plurality of migration statuses; and providing the forecast display for display to a user.

2. The method of claim 1, wherein the plurality of migration statuses includes a scheduled status, and wherein the generating forecast data step includes determining, for each combination of the at least one migration component and one of the plurality of time frames, an amount of targets having the scheduled status.

3. The method of claim 1, wherein the plurality of migration statuses includes a projected status, and wherein the generating forecast data step includes determining, for each combination of the at least one migration component and one of the plurality of time frames, an amount of targets having the projected status.

4. The method of claim 1, wherein the target data further identifies one of a plurality of sites, and wherein the forecast data is further based on the plurality of sites.

5. The method of claim 1, further comprising obtaining an estimate value for each of the plurality of time frames, wherein the forecast data is further based on the estimate values.

6. The method of claim 1, wherein the generating step includes generating forecast data for a lead time frame that comprises a combination of at least two of the plurality of time frames.

7. The method of claim 1, further comprising obtaining a current inventory for the at least one migration component.

8. The method of claim 7, wherein the forecast display further includes the current inventory.

9. The method of claim 1, further comprising:
obtaining inventory data for the at least one migration component; and
generating an inventory display that includes the inventory data for the at least one migration component.

10. The method of claim 9, wherein the inventory display further includes forecast data for the at least one migration component.

11. The method of claim 9, wherein the inventory display further includes an amount available for the at least one migration component that is based on the forecast data and the inventory data.

12. The method of claim 1, further comprising managing the target data.

13. A method of generating a system for managing inventory for a migration, the method comprising:
providing a computer system operable to:
obtain target data for a set of targets on at least one computing device,
wherein the target data for each target in the set of targets includes migration data for at least one migration component corresponding to the target and at least one of: a location of the target or a configuration of the target,
wherein the at least one migration component comprises at least one of a hardware or software information technology component to be updated or changed as part of the migration,
wherein the migration data for the at least one migration component includes one of a plurality of migration statuses and a migration date, a meaning of the migration date being based on the one of the plurality of migration statuses;
obtain a plurality of time frames on the at least one computing device,
wherein a start time frame is automatically determined based on a current date;
generate forecast data automatically for each of the at least one migration component based on the target data and the plurality of time frames using the at least one computing device;
generate a forecast display that includes the forecast data for each of the at least one migration component using the at least one computing device,
wherein the forecast display displays the forecast data using a hierarchical structure that includes at least two of: a site, an item type, and the plurality of migration statuses; and
provide the forecast display for display to a user.

14. The method of claim 13, wherein the plurality of migration statuses includes a scheduled status, and wherein the generating forecast data includes determining, for each combination of the at least one migration component and one of the plurality of time frames, an amount of targets having the scheduled status.

15. The method of claim 13, wherein the plurality of migration statuses includes a projected status, and wherein the generating forecast data includes determining, for each combination of the at least one migration component and one of the plurality of time frames, an amount of targets having the projected status.

16. The method of claim 13, wherein the target data further identifies one of a plurality of sites, and wherein the forecast data is further based on the plurality of sites.

17. The method of claim 13, wherein the computer system is further operable to obtain an estimate value for each of the plurality of time frames, wherein the forecast data is further based on the estimate values.

18. The method of claim 13, wherein the generating includes generating forecast data for a lead time frame that comprises a combination of at least two of the plurality of time frames.

19. The method of claim 13, the computer system is further operable to obtain a current inventory for the at least one migration component.

20. The method of claim 19, wherein the forecast display further includes the current inventory.

21. The method of claim 13, the computer system is further operable to:
- obtain inventory data for the at least one migration component; and
- generate an inventory display that includes the inventory data for the at least one migration component.

22. A computer program comprising program code embodied in at least one non-transitory computer-readable medium, which when executed, enables a computer system to implement a method of managing inventory for a migration, the method comprising:
- obtaining target data for a set of targets on at least one computing device,
- wherein the target data for each target in the set of targets includes migration data for at least one migration component corresponding to the target and at least one of: a location of the target or a configuration of the target,
- wherein the at least one migration component comprises at least one of a hardware or software information technology component to be updated or changed as part of the migration,
- wherein the migration data for the at least one migration component includes one of a plurality of migration statuses and a migration date, a meaning of the migration date being based on the one of the plurality of migration statuses;
- obtaining a plurality of time frames on the at least one computing device,
- wherein a start time frame is automatically determined based on a current date;
- generating forecast data automatically for each of the at least one migration component based on the target data and the plurality of time frames using the at least one computing device;
- generating a forecast display that includes the forecast data for each of the at least one migration component using the at least one computing device,
- wherein the forecast display displays the forecast data using a hierarchical structure that includes at least two of: a site, an item type, and the plurality of migration statuses; and
- providing the forecast display for display to a user.

23. The computer program of claim 22, wherein the plurality of migration statuses includes a scheduled status, and wherein the generating forecast data includes determining, for each combination of the at least one migration component and one of the plurality of time frames, an amount of targets having the scheduled status.

24. The computer program of claim 22, wherein the plurality of migration statuses includes a projected status, and wherein the generating forecast data includes determining, for each combination of the at least one migration component and one of the plurality of time frames, an amount of targets having the projected status.

25. The computer program of claim 22, wherein the target data further identifies one of a plurality of sites, and wherein the forecast data is further based on the plurality of sites.

26. The computer program of claim 22, the method further comprising obtaining an estimate value for each of the plurality of time frames, wherein the forecast data is further based on the estimate values.

27. The computer program of claim 22, wherein the generating includes generating forecast data for a lead time frame that comprises a combination of at least two of the plurality of time frames.

28. The computer program of claim 22, the method further comprising obtaining a current inventory for the at least one migration component.

29. The computer program of claim 28, wherein the forecast display further includes the current inventory.

30. The computer program of claim 22, the method further comprising:
- obtaining inventory data for the at least one migration component; and
- generating an inventory display that includes the inventory data for the at least one migration component.

* * * * *